United States Patent
Okamura et al.

(10) Patent No.: US 9,984,244 B2
(45) Date of Patent: May 29, 2018

(54) CONTROLLER, INFORMATION PROCESSING APPARATUS, AND RECORDING MEDIUM

(71) Applicant: OMRON Corporation, Kyoto-shi, Kyoto (JP)

(72) Inventors: Kotaro Okamura, Kusatsu (JP); Masanori Ota, Otsu (JP); Yoshihide Nishiyama, Yokohama (JP); Koji Yaoita, Kyoto (JP); Masaru Nakasaki, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 146 days.

(21) Appl. No.: 14/088,481

(22) Filed: Nov. 25, 2013

(65) Prior Publication Data
US 2014/0236997 A1 Aug. 21, 2014

(30) Foreign Application Priority Data
Feb. 15, 2013 (JP) .................................. 2013-028265

(51) Int. Cl.
G06F 17/30 (2006.01)
G06F 21/62 (2013.01)
G06F 11/36 (2006.01)

(52) U.S. Cl.
CPC ...... G06F 21/6218 (2013.01); G06F 11/3664 (2013.01); G06F 11/3684 (2013.01)

(58) Field of Classification Search
CPC combination set(s) only.
See application file for complete search history.

(56) References Cited

U.S. PATENT DOCUMENTS 7,106,843 B1 * 9/2006 Gainsboro .......... H04M 3/2281
379/191
7,721,154 B1 5/2010 Jaamour et al.
(Continued)

FOREIGN PATENT DOCUMENTS

JP 2002-23812 A 1/2002
JP 2009-104490 A 5/2009
(Continued)

OTHER PUBLICATIONS

"Mocking the JDBC objects with using the fluent interface", IP.com Journal, IP.com Inc., West Henrietta, NY, US, Jun. 8, 2012, XP013151949, ISSN: 1533-0001 *the whole document*.

*Primary Examiner* — Shyue Jiunn Hwa
(74) *Attorney, Agent, or Firm* — Metrolexis Law Group, PLLC

(57) ABSTRACT

A technique for facilitating debugging in a user program which operates by cooperation of a PLC and another system in a control system including a controller and another system. A CPU unit has a communication interface, executes a user program, calls DB connection service in accordance with an instruction included in the user program, and generates a statement to access a database device. In the DB connection service, operation is performed while switching a first mode and a second mode. In the first mode, a statement according to an access instruction is generated, the generated statement is transmitted to a database system, and a result of a response is sent to the user program. In the second mode, without transmitting the statement to the database device, a result of execution corresponding to the statement is sent to the user program.

20 Claims, 12 Drawing Sheets

(56) References Cited

U.S. PATENT DOCUMENTS

| | | | |
|---|---|---|---|
| 2003/0150908 A1* | 8/2003 | Pokorny | B23Q 35/12 235/375 |
| 2003/0155415 A1* | 8/2003 | Markham | G06Q 50/00 235/376 |
| 2004/0249651 A1* | 12/2004 | Fischer | G05B 19/4185 700/3 |
| 2005/0049999 A1 | 3/2005 | Birn et al. | |
| 2006/0224254 A1* | 10/2006 | Rumi | G05B 13/0275 700/28 |
| 2010/0005340 A1 | 1/2010 | Belknap et al. | |
| 2010/0192048 A1* | 7/2010 | Washio | H04L 1/0084 714/799 |
| 2013/0079060 A1* | 3/2013 | Pivit | H01Q 3/267 455/561 |
| 2014/0088735 A1* | 3/2014 | Hamasaki | G05B 19/042 700/40 |

FOREIGN PATENT DOCUMENTS

| | | | |
|---|---|---|---|
| JP | 2012194682 | * | 3/2011 |
| JP | 2012-108642 A | | 6/2012 |
| JP | 2012-198636 A | | 10/2012 |

* cited by examiner

FIG. 7

| Entry | Date and time | Category | Log name | Result | Connection name | Serial ID | Table name | SQL statement |
|---|---|---|---|---|---|---|---|---|
| 0 | 2013/1/14 09:00:00 | SQL | INSERT | 0x0000 | Database_01 | 0 | TABLE_Production | "INSERT INTO TABLE_Production (Column1) VALUES( '500' )" |
| 1 | 2013/1/14 09:10:30 | SQL | INSERT | 0x0000 | Database_01 | 1 | TABLE_Production | "INSERT INTO TABLE_Production (Column1) VALUES( '600' )" |
| 2 | 2013/1/14 09:30:25 | SQL | INSERT | 0x0000 | Database_01 | 2 | TABLE_Production | "INSERT INTO TABLE_Production (Column1) VALUES( '1000' )" |
| 3 | 2013/1/14 09:40:00 | SQL | INSERT | 0x0000 | Database_01 | 3 | TABLE_Production | "INSERT INTO TABLE_Production (Column1) VALUES( '500' )" |

FIG. 12

Operation log

Operation log 01 — 380

| Entry | Date and time | Category | Log name | Result | Connection name | Serial ID | Table name | SQL statement |
|---|---|---|---|---|---|---|---|---|
| 0 | 2013/1/14 09:00:00 | SQL | INSERT | 0x0000 | Database_01 | 0 | TABLE_Production | "(INSERT... |
| 1 | 2013/1/14 09:10:30 | SQL | INSERT | 0x0000 | Database_01 | 1 | TABLE_Production | "(INSERT... |
| 2 | 2013/1/14 09:30:25 | SQL | INSERT | 0x0000 | Database_01 | 2 | TABLE_Production | "(INSERT... |
| 3 | 2013/1/14 09:40:00 | SQL | INSERT | 0x0000 | Database_01 | 3 | TABLE_Production | "(INSERT... |

— 388

Detailed information

" INSERT INTO TABLE_Production(Column1) VALUES( '500' )"

— 389

[ Acquisition ] [ Clear ] — 390

381, 382, 383, 384

CONTROLLER, INFORMATION PROCESSING APPARATUS, AND RECORDING MEDIUM

BACKGROUND OF THE INVENTION

1. Technical Field

The present invention relates to a control system including a controller which executes a user program periodically, and more particularly, to a control system which is connected to a database system.

2. Related Art

Machinery and equipment used in many production sites are typically controlled by a control system including, as a main component, a controller such as a programmable logic controller (hereinbelow, also called "PLC"). A controller such as a PLC is used for a control or the like of an automatic machine in a factory or the like, has a plurality of input/output functions, for example, sequentially reads values which are output from sensors and the like and holds the values.

In recent years, a PLC which is connected to a database system is known. A PLC stores data held in the PLC into a database system. It facilitates sharing of data among information processing apparatuses connected to a database, collection of various pieces of data, counting, analysis, and the like of the data. For example, Japanese Unexamined Patent Publication No. 2012-108642 discloses a PLC having the function of transmitting a SQL process group including a plurality of SQL statements to access a database to the database.

SUMMARY

In a configuration of connecting a PLC and another system (such as a database system), there is a case that the PLC has to be started up before another system is operated. For example, the control operation of the PLC is verified by using a real machine and verification of the operation of a part connected to another system such as a database system is desired to be verified at a later date. In the case where verification of the control operation of the PLC is finished and the operation in the case where the PLC is connected to another system is desired to be evaluated, in a state where the another system is not operating yet, the another system has to be started by a dummy program, and connection between the PLC and the another system has to be verified by using a dummy system. Due to this, at a stage before the another system connected to the PLC operates, startup of the dummy system and the like are necessary, and debugging of a user program operated by the PLC becomes complicated.

Therefore, in the configuration of connecting a PLC to another system, a technique of facilitating debugging of a user program which is operated by cooperation of the PLC and the another system is in demand.

A controller according to an aspect of the present invention includes: a communication interface configured to be connected to a database system; an instruction executing unit configured to execute a user program for controlling a control object; and an access processing unit, at the time of executing the user program including an access instruction to access the database system by the instruction executing unit, configured to control an access to the database system via the communication interface by a statement according to the access instruction, wherein the access processing unit operates in a first mode and a second mode, in the first mode, transmits a statement according to the access instruction to the database system and sends a result of response to the statement to the user program, and in the second mode, sends an execution result corresponding to the statement to the user program without transmitting the statement to the database system.

Preferably, the controller further includes a counting unit configured to count time, wherein at the time of executing a predetermined process in the user program, the instruction executing unit may store into a memory the process and time counted by the counting unit in association with each other, as a log, and the access processing unit may store into the memory a process according to the access instruction and time counted by the counting unit in association with each other, as the log.

Preferably, the access processing unit generates a statement according to the access instruction and stores the generated statement as the log into the memory.

Preferably, in the second mode, the access processing unit transmits to the user program, as an execution result corresponding to the statement according to the access instruction, a response indicating that an access to the database system according to the statement is normally performed or a response indicative of occurrence of an error in an access to the database system according to the statement.

Preferably, a control unit includes a response time setting unit configured to accept a setting of response time and, in the case of operating in the second mode, outputs a result of a process according to the access instruction after lapse of the set response time since start of the process.

Preferably, the controller further includes an input/output unit configured to transmit/receive data to/from an information processing apparatus connected to the controller. The input/output unit outputs a result of a response to the user program by the access processing unit to the information processing apparatus in response to a request of the information processing apparatus.

Preferably, the input/output unit accepts a designation of either the first mode or the second mode in which the access processing unit is to be operated from the information processing apparatus, and the access processing unit switches either the first or second mode in accordance with the designation accepted from the information processing apparatus.

Preferably, the user program includes a designation instruction of instructing either the first mode or the second mode in which the access processing unit is to be operated, and the access processing unit operates in either the first mode or the second mode in accordance with the designation indicated by the designation instruction.

A program according to an aspect of the present invention is configured to control operation of a controller, wherein the controller includes a communication interface configured to access a database system, a processor, and a memory, and the program causes the processor to execute: a step of executing a user program to control a control object; and a step of, at the time of executing the user program including an access instruction to access the database system, controlling an access to the database system via the communication interface by a statement according to the access instruction, a step of controlling an access to the database system by the statement according to the access instruction is performed in the first and second modes, and the program causes the processor to perform a step of in the first mode, transmitting a statement according to the access instruction to the database system and sending the result of response of the statement to the user program, and in the second mode, sending the result of execution corresponding to the statement to the user program without transmitting the statement to the database system.

An information processing apparatus according to an aspect of the present invention is to be connected to a controller, wherein the controller includes: a communication interface configured to be connected to a database system; an instruction executing unit configured to execute a user program for controlling a control object; an access processing unit, at the time of executing the user program including an access instruction for accessing the database system by the instruction executing unit, configured to control an access via the communication interface to the database system by a statement according to the access instruction; and an input/output unit configured to be connected to the information processing apparatus and to transmit/receive data to/from the information processing apparatus, the access processing unit operates in a first mode and a second mode, in the first mode, transmits a statement according to the access instruction to the database system and sends a result of a response to the statement to the user program. In the second mode, the access processing unit sends a result of execution corresponding to the statement to the user program without transmitting the statement to the database system, and the information processing unit includes: a reception processing unit configured to receive a result of a response to the user program by the access processing unit via the input/output unit of the controller; and a display processing unit configured to display the response result received by the reception processing unit on a monitor.

A controller according to an aspect of the present invention includes: a communication interface configured to be connected to a database system; a processor; and a memory, wherein the processor is configured to operate while switching a first mode and a second mode, executes a user program for controlling a control object, at the time of the execution of the user program including an access instruction to access the database system, controls an access via the communication interface to the database system by a statement according to the access instruction, in the case of operation in the first mode, transmits the statement according to the access instruction to the database system, sends a result of response to the statement to the user program, in the case of operation in the second mode, sends a result of execution corresponding to the statement to the user program without transmitting the statement to the database system.

According to the present invention, in the configuration of connecting a PLC to another system, debugging of a user program operated by cooperation of the PLC and another system can be facilitated.

BRIEF DESCRIPTION OF THE DRAWINGS

FIG. 7 is a diagram illustrating an operation log:

FIG. 12 is a diagram illustrating an example of a user interface provided in the support device in the embodiment.

DETAILED DESCRIPTION

Figure 1:
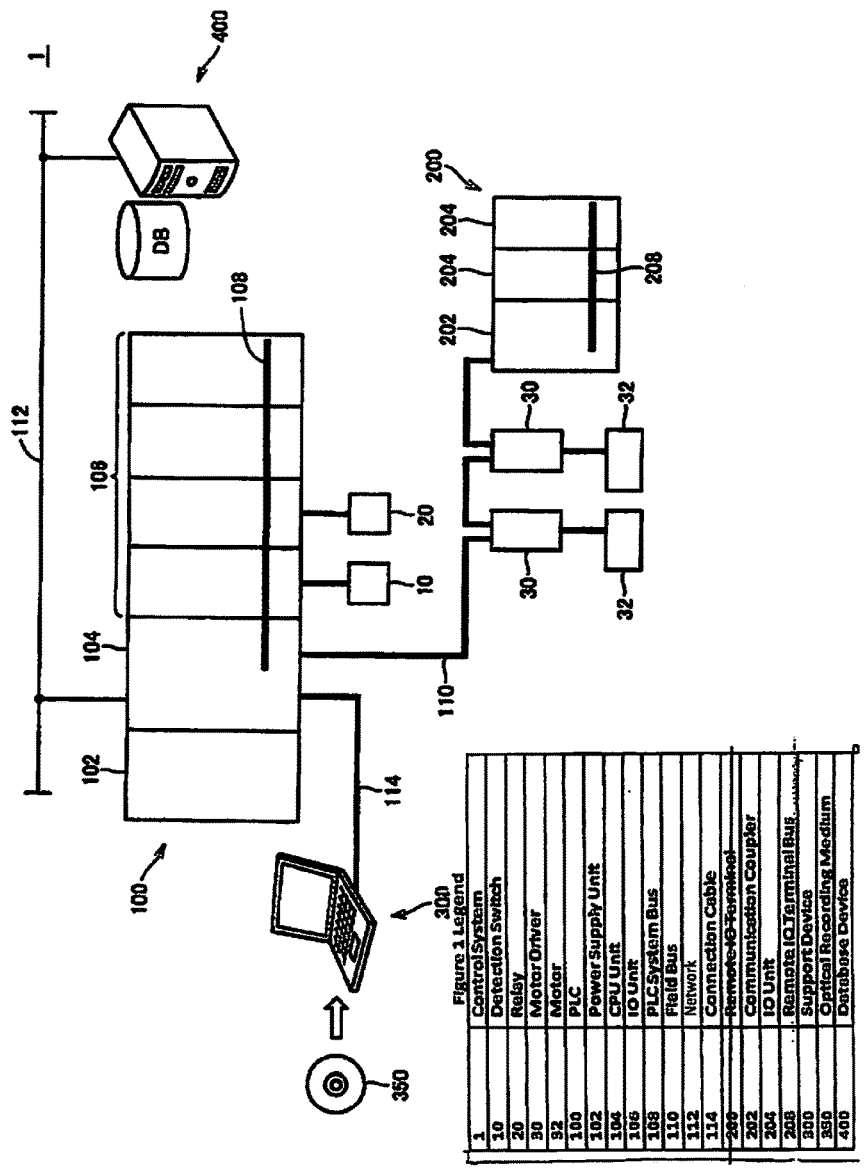
FIG. 1 is a schematic diagram illustrating the configuration of a control system according to an embodiment.

Embodiments of the present invention will be described in detail with reference to the drawings. The same reference numerals are designated to the same or corresponding parts in the diagram and their description will not be repeated.

A. System Configuration

First, the configuration of a control system according to the embodiment will be described. In the embodiment, a programmable controller (PLC) controlling a control object such as machinery or equipment will be described as a typical example of a controller. The controller according to the present invention is not limited to a PLC but can be applied to various controllers.

FIG. 1 is a schematic diagram illustrating the configuration of a control system 1 according to an embodiment. Referring to FIG. 1, the control system 1 includes a PLC 100, a support device 300 connected to the PLC 100, and a database device 400 receiving an access from the PLC 100. The PLC 100 executes a user program as will be described later periodically or as an event. The user program is generated by the user of the PLC 100. The user can generate, for example, a program (source program) including an access instruction by operating the support device 300. The support device 300 converts the source program to a form which can be executed in the PLC 100 and transmits the converted user program to the PLC 100. The PLC 100 executes the user program and can access the database device 400 in accordance with the access instruction included in the user program.

That is, the PLC 100 and the database device 400 are constructed so that data can be transmitted/received to/from each other via a network 112 such as the Ethernet (registered trademark).

The support device 300 is a typical example of an information processing device which can be connected to the PLC 100. The support device 300 is connected to the PLC 100 via a connection cable 114, and provides functions such as settings of various parameters, programming, monitoring, debugging, and the like to the PLC 100. The PLC 100 and the support device 300 can typically perform communication each other in accordance with the USB (Universal Serial Bus) standard.

The PLC 100 includes a CPU unit 104 executing a control operation and at least one IO (Input/Output) unit 106. Those units are constructed so as to transmit/receive data each other via a PLC system bus 108. To those units, power of proper voltage is supplied by a power supply unit 102.

In the control system 1, the PLC 100 transmits/receives data to/from various field devices via the IO unit 106 (connected via the PLC system bus 108) and/or a field bus 110. The field devices include an actuator for performing some processes on a control object and a sensor for obtaining various pieces of information from a control object. In FIG. 1, as an example of such field devices, the control system 1 includes a detection switch 10, a relay 20, and a servo motor driver 30 driving a motor 32. To the PLC 100, a remote IO terminal 200 is connected via the field bus 110. The remote IO terminal 200 basically performs processes related to a general input/output process in a manner similar to the IO unit 106. More concretely, the remote IO terminal 200 includes a communication coupler 202 for performing a process related to data transmission in the field bus 110 and at least one IO unit 204. Those units are constructed so as to transmit/receive data from one another via a remote IO terminal bus 208.

B. Configuration of PLC 100

Figure 2:
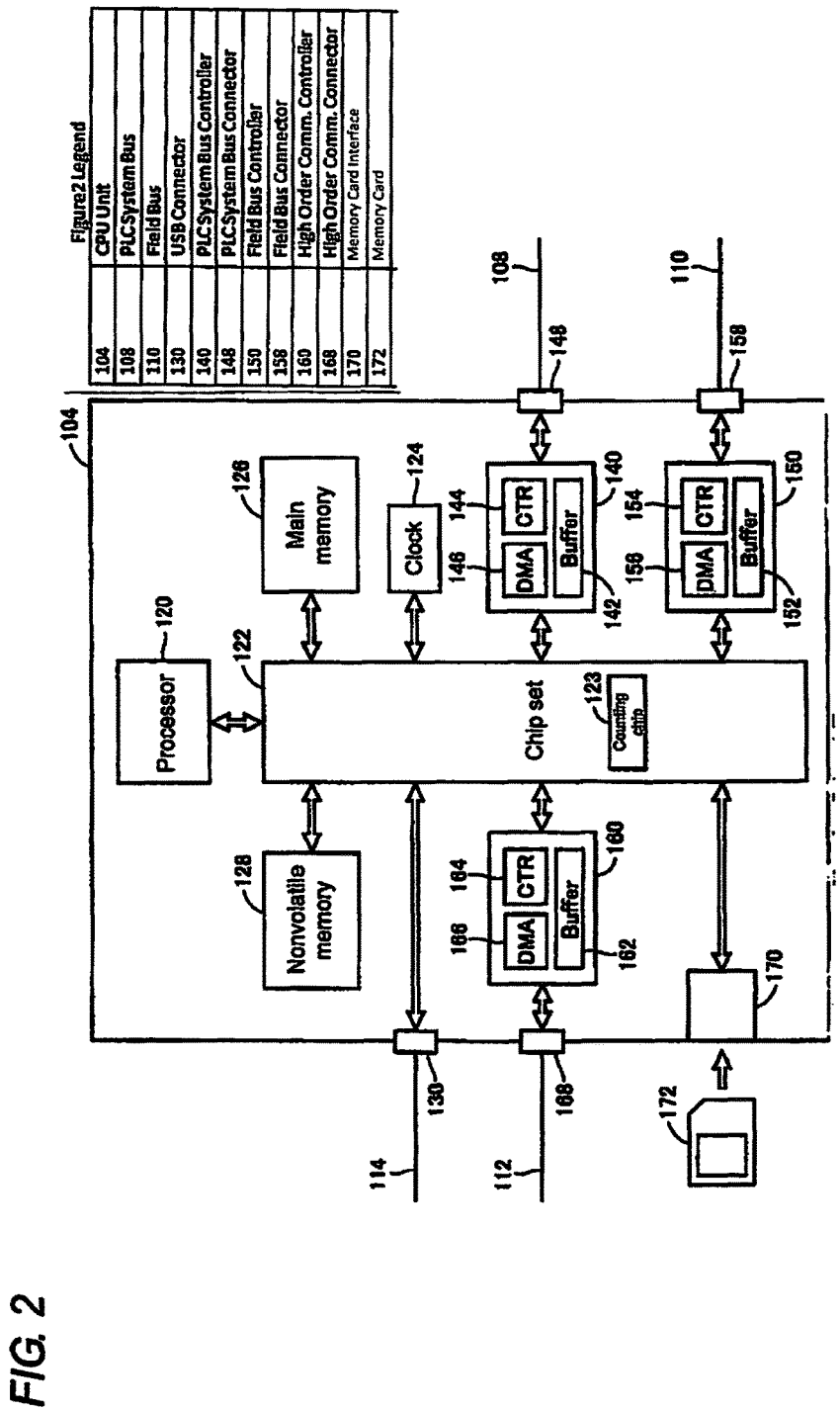
FIG. 2 is a schematic diagram illustrating a hardware configuration of a main part of a PLC according to the embodiment.
Figure 3:
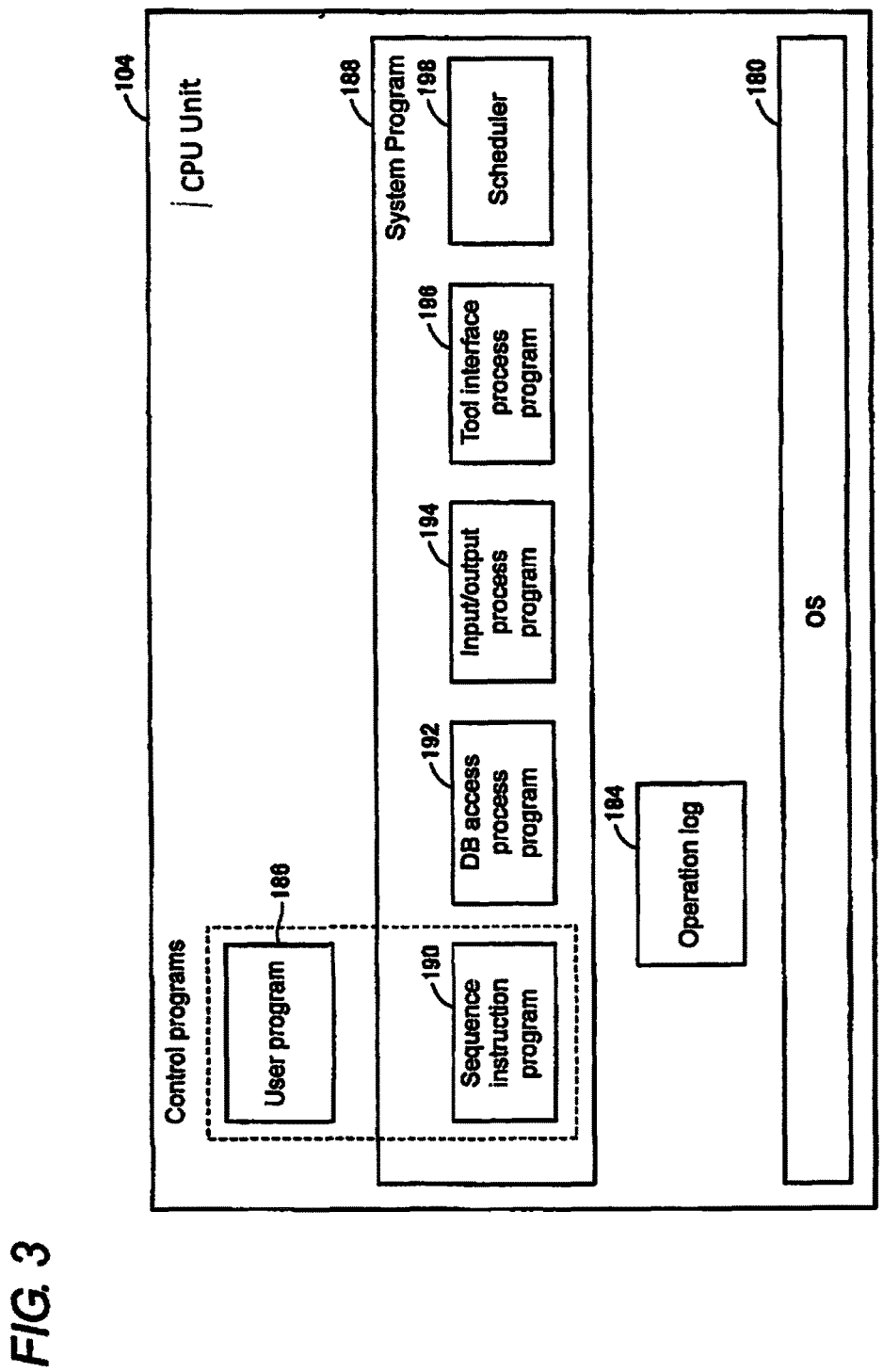
FIG. 3 is a schematic diagram illustrating a software configuration of the PLC according to the embodiment.

Next, the configuration of the PLC 100 according to the embodiment will be described. FIG. 2 is a schematic diagram illustrating a hardware configuration illustrating a main part of the PLC 100 according to the embodiment. FIG. 3 is a schematic diagram illustrating a software configuration of the PLC 100 according to the embodiment.

With reference to FIG. 2, the hardware configuration of the CPU unit 104 of the PLC 100 will be described. The CPU unit 104 includes a processor 120, a chip set 122, a system clock 124, a main memory 126, a nonvolatile memory 128, a USB connector 130, a PLC system bus controller 140, a field bus controller 150, a high-order communication controller 160, and a memory card interface 170. The chip set 122 and the other components are coupled to one another via various buses.

The processor 120 and the chip set 122 are constructed typically in accordance with a general computer architecture. That is, the processor 120 interprets and executes instruction codes which are sequentially supplied in accordance with internal clocks from the chip set 122. The chip set 122 transmits/receives internal data to/from the various components that are being connected and generates an instruction code necessary for the processor 120. The system clock 124 generates a system clock in a predetermined cycle and provides it to the processor 120. The chip set 122 has a function of caching data obtained as a result of execution of an arithmetic process in the processor 120 or the like. The chip set 122 includes a counting chip 123 which receives a clock supplied from the system clock 124 and counts time.

The CPU unit 104 has, as storing means, the main memory 126 and the nonvolatile memory 128. The main memory 126 is a volatile storage region, holds various programs to be executed by the processor 120, and is also used as a work memory when the various programs are executed. The nonvolatile memory 128 holds an OS (Operating System), a system program, a user program, log information, and the like in a nonvolatile manner.

The USB connector 130 is an interface for connecting the support device 300 and the CPU unit 104. Typically, an executable program which is transferred from the support device 300 and the like is loaded in the CPU unit 104 via the USB connector 130.

The CPU unit 104 has, as communication means, the PLC system bus controller 140, the field bus controller 150, and the high-order communication controller 160. Those communication circuits transmit and receive data.

The PLC system bus controller 140 controls transmission/reception of data via the PLC system bus 108. More concretely, the PLC system bus controller 140 includes a buffer memory 142, a PLC system bus control circuit 144, and a DMA (Dynamic Memory Access) control circuit 146. The PLC system bus controller 140 is connected to the PLC system bus 108 via a PLC system bus connector 148.

The field bus controller 150 includes a buffer memory 152, a field bus control circuit 154, and a DMA control circuit 156. The field bus controller 150 is connected to the field bus 110 via a field bus connector 158. The high-order communication controller 160 includes a buffer memory 162, a high-order communication control circuit 164, and a DMA control circuit 166. The high-order communication controller 160 is connected to the network 112 via a high-order communication connector 168.

A memory card interface 170 connects the processor 120 and a memory card 172 which can be detachably connected to the CPU unit 104.

Referring now to FIG. 3, a software configuration for realizing various functions provided by the PLC 100 according to the embodiment will be described. An instruction code included in the software is read at a proper timing and executed by the processor 120 of the CPU unit 104.

In FIG. 3, software executed in the CPU unit 104 is an OS 180, a system program 188, and a user program 186.

The OS 180 provide basic execution environment for the processor 120 to execute the system program 188 and the user program 186.

The system program 188 is a software group for providing basic functions of the PLC 100. Concretely, the system program 188 includes a sequence instruction program 190, a DB (database) access process program 192, an input/output process program 194, a tool interface process program 196, and a scheduler 198.

The user program 186 is a program arbitrarily generated according to a control purpose for a control object. That is, the user program 186 is arbitrarily designed in accordance with an object to be controlled by using the control system 1.

The user program 186 realizes a control purpose of the user in cooperation with the sequence instruction program 190. That is, the user program 186 realizes a programmed operation by using an instruction, a function, a function module, or the like provided by the sequence instruction program 190. Therefore, the user program 186 and the sequence instruction program 190 will be also collectively called "control programs".

In the operation log 184, when a predetermined event occurs accompanying execution of the system program 188 and the user program 186, information of the occurred event is stored in association with time information. That is, in the operation log 184, various pieces of information accompanying execution of the system program 188 and/or the user program 186 is stored as a log (history information).

Hereinafter, each of the programs will be described more specifically.

The sequence instruction program 190 includes an instruction code group, accompanying execution of the user program 186, for calling entity of a sequence instruction designated in the user program 186 and realizing the instruction.

The DB access process program 192 includes an instruction code group for realizing a process necessary to access the database device 400, accompanying execution of the user program 186. The DB access process program 192 includes an execution code corresponding to a designable instruction in the user program 186.

The input/output process program 194 is a program for managing acquisition of input data and transmission of output data from/to the IO unit 106 and the various field devices.

The tool interface process program 196 provides an interface for transmitting/receiving data to/from the support device 300.

The scheduler 198 generates a thread and a procedure for executing a control program in accordance with a predetermined priority, the value of a system timer, and the like.

As described above, the user program 186 is generated according to a control purpose of the user. The user program 186 typically is of an object program form which can be executed by the processor 120 of the CPU unit 104. The user program 186 is generated when a source program described in a ladder form or a function block form is compiled in the support device 300. The generated user program in the object program format is transferred from the support device 300 to the CPU unit 104 and stored in the nonvolatile memory 128 or the like.

The PLC 100 has a configuration described with reference to FIGS. 2 and 3 and functions as an "instruction executing unit configured to execute a user program for controlling a control object" when the processor 120 executes the system program 188 and the user program 186. When the processor 120 executes the DB access process program 192 and the user program 186, the PLC 100 functions as an "access processing unit, at the time of execution by the instruction executing unit, of a user program including an access instruction for accessing the database device 400, configured to control an access via a communication interface to the database device 400 by a statement according to the access instruction". By executing the DB access process program 192, the PLC 100 sets the operation mode of the DB connection service by a process which will be described later, to either a first mode (operation mode) or a second mode (test mode). When the processor 120 executes the DB access process program 192 in accordance with the access instruction included in the user program 186, the PLC 100 exhibits the function of "transmitting a statement (SQL statement) according to the access instruction to the database device 400 and sending a result of response of the statement to the user program 186 in the first mode, and sending the execution result corresponding to the statement to the user program 186 without transmitting the statement to the database device 400 in the second mode".

C. Configuration of Support Device 300

Next, the support device 300 according to the embodiment will be described. The support device 300 is to support use of the CPU unit 104 of the PLC 100 and provides functions of setting various parameters, programming, monitoring, debugging, and the like for the PLC 100.

Figure 4:
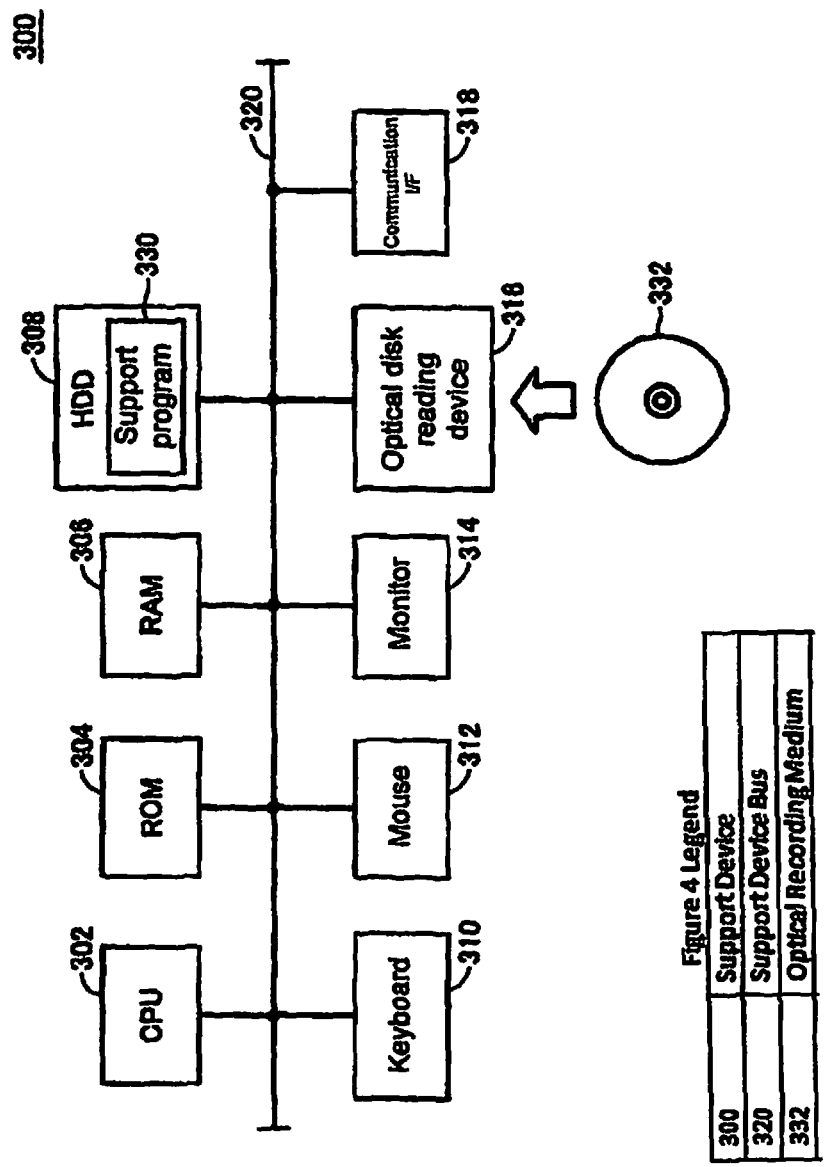
FIG. 4 is a schematic diagram illustrating a hardware configuration of a support device used by being connected to the PLC according to the embodiment.

FIG. 4 is a schematic diagram illustrating a hardware configuration of the support device 300 used by being connected to the PLC 100 according to the embodiment. The support device 300 is typically constructed by a general computer.

Referring to FIG. 4, the support device 300 includes a CPU 302 executing various programs including an OS, a ROM (Read Only Memory) 304 storing BIOS and various pieces of data, a memory RAM 306 providing a work area for storing data necessary to execute a program in the CPU 302, and a hard disk (HDD) 308 storing a program or the like executed by the CPU 302 in a nonvolatile manner. More concretely, in the hard disk 308, a support program 330 for realizing the functions provided by the support device 300 is stored.

The support device 300 also includes a keyboard 310 and a mouse 312 accepting an operation from the user, and a monitor 314 for providing information to the user. Further, the support device 300 includes a communication interface (IF) 318 for communication with the PLC 100 (CPU unit 104) and the like.

The support program 330 and the like executed by the support device 300 are stored in an optical recording medium 332 and distributed. A program stored in the optical recording medium 332 is read by an optical disk reading device 316 and stored in the hard disk 308 or the like. Alternatively, a program may be downloaded from a high-order host computer or the like via a network.

The support device 300 is connected to the PLC 100 via the communication I/F 318. When the CPU 302 executes the support program 330, the support device 300 exhibits the function of a "reception processing unit configured to receive, from the PLC 100, a result of response to the user program 186 by the DB access process program 192" and a "display processing unit configured to display the response result received by the reception processing unit to the monitor 314".

D. Configuration of Database Device 400

Next, the database device 400 according to the embodiment will be described. As the database device 400, a known configuration providing a database can be employed. As such a database, an arbitrary configuration of a relational data type or an object data type can be employed. Since the database device 400 is constructed according to a general computer architecture, its detailed description will not be repeated here.

The database device 400 receives a connection request or an access request (an SQL statement in a relational data type) from the PLC 100, executes a necessary process, and sends the process result or the like as a response to the PLC 100.

E. Outline of Process of Accessing DB (Database) and Logging

Figure 5:
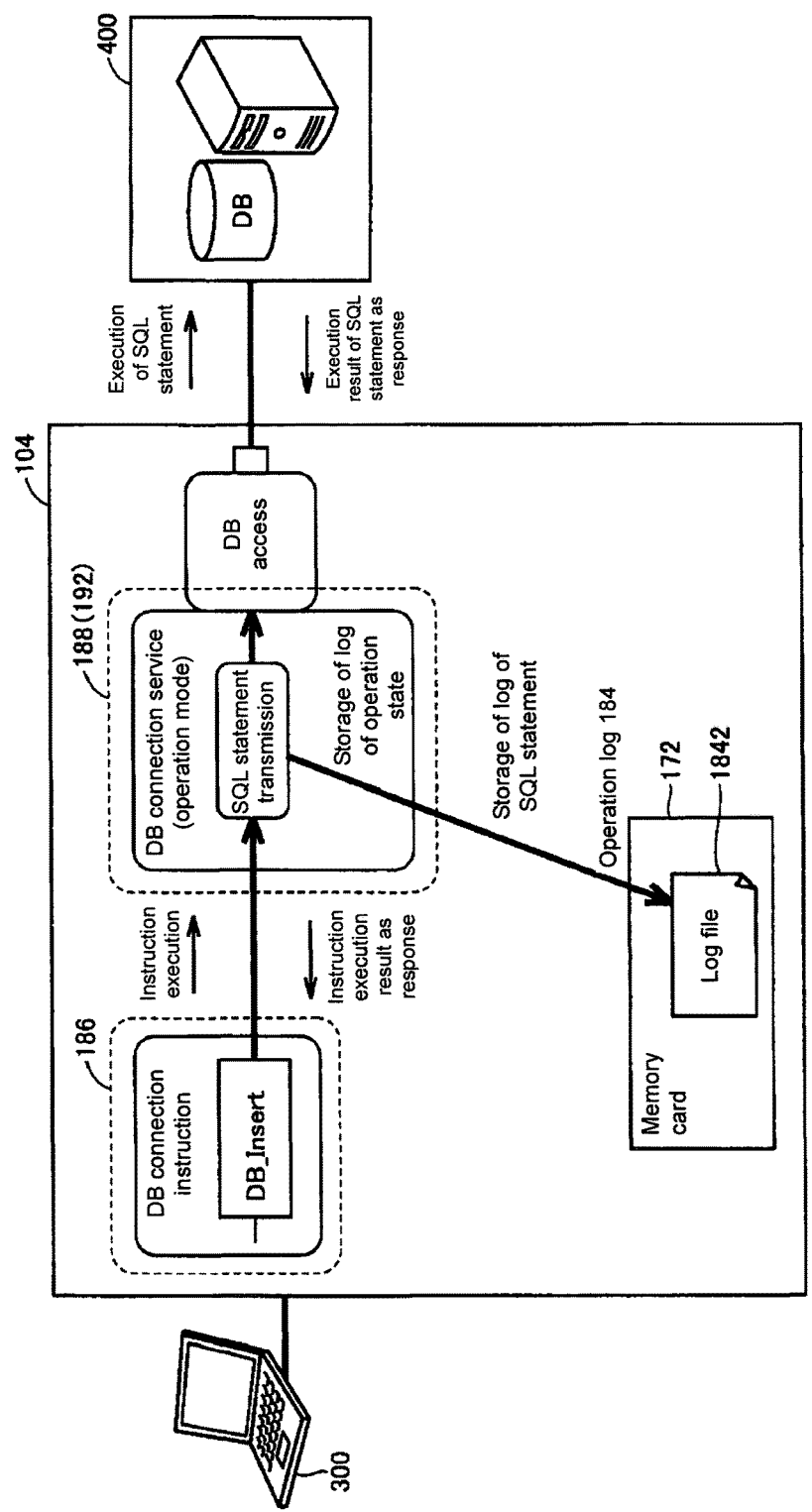
FIG. 5 is a diagram illustrating outline of communication process between the PLC and a database device and outline of logging in the embodiment.

Next, outline of a process of the PLC 100 to access the database device 400 in the control system 1 according to the embodiment will be described. FIG. 5 is a diagram illustrating outline of a process of communication between the PLC 100 and the database device 400 in the embodiment and outline of logging.

The CPU unit 104 in the PLC 100 of the embodiment performs a process of accessing the database device 400 by the DB connection service. In the DB connection service, operation is performed while switching a plurality of operation modes. In the embodiment, in the DB connection service, operation is performed while switching the operation mode between an operating mode (first mode) and a test mode (second mode).

The operating mode is an operation mode used in the case of causing the control system 1 to operate in a state where the PLC 100 is connected to another system such as the database device 400. The test mode is an operation mode used at the time of checking the operation of the user program 186 using an instruction for connection to another system (DB connection instruction in the embodiment) in a state where the PLC 100 is not connected to another system. In the embodiment, in the operation in the test mode, without executing transmission of the SQL statement to the database device 400, the DB connection service is normally finished. FIG. 5 illustrates the case where the DB connection service of the CPU unit 104 operates in the operating mode.

It is assumed that an instruction to access the database device 400 (for example, the DB connection instruction "DB_Insert" in FIG. 5) is designated in the user program 186. In the case of operating the DB connection service in the operating mode, at the execution timing of the DB connection instruction, the CPU unit 104 calls a corresponding instruction code of the DB access process program 192 (FIG. 3), generates an SQL statement including a request for connection to the database device 400, and transmits the generated SQL statement to the database device 400. By the DB access process program 192, the DB connection service is realized. By execution of the DB connection instruction in the user program 186, the DB connection service is triggered. In the DB connection service, an SQL statement is generated, and the generated SQL statement is transmitted to a DB access function. The DB access function is driver software prepared to access various database systems. The DB access function is a function realized by the high-order communication controller 160 (FIG. 2) and the DB access process program 192 (FIG. 3), and transmits the SQL statement received from the DB connection service to the database device 400 via the network 112.

The database device 400 receives the SQL statement from the PLC 100, executes a process according to the received SQL statement and, as necessary, transmits the result to the PLC 100.

The log output function according to the embodiment can output a log which is output accompanying execution of a predetermined process determined by a program (hereinbelow, also called "execution log") and a log which is output accompanying occurrence of a failure in execution of a program or a failure in hardware (hereinbelow, also called "event log"). The operation log 184 includes all of those logs. In the embodiment, an example that the PLC 100 writes the operation log 184 to a recording medium such as a memory card loaded to the PLC 100 will be described. In a recording medium such as a memory card, the operation log 184 is stored as a log file.

The execution log is information obtained by recording a process of a predetermined kind which is executed, in association with time information. By the execution log, execution of a process designated in the user program 186 can be recognized. Basically, the execution log is always logged during operation of the PLC 100 (a state where a process of a predetermined kind is executed by a program). An event log is information of a designated process recorded in association with time information in the case such that execution of the process fails. Typically, in the case such that a designated process is interrupted due to an error or the like, the process is logged. For example, in the DB connection service, the SQL statement generated according to the DB connection instruction is output as a log, in association with time information.

FIG. 5 illustrates an example that an instruction of connection to the database device 400 is defined in the user program 186. In the example of FIG. 5, the user generates a program including an instruction of connection to the database device 400 by a support program executed by the support device 300. The support device 300 converts the generated program to a format which can be executed by the PLC 100 and transmits the converted user program from the support device 300 to the PLC 100. An instruction defined by the user program 186 can be arbitrarily defined, and the kind of the defined instruction does not exert any influence on the scope of the present invention.

In the DB connection service, in response to execution of the DB connection instruction (generation and transmission of the SQL statement), the information designated by the instruction is written in association with time information (that is, as an execution log) into the operation log 184 (in the example of FIG. 5, a log file 1842 stored in the memory card 172). That is, the log of the operation state of the PLC 100 is stored. At this time, the user does not have to explicitly instruct writing of the execution log to the operation log 184. A system environment is constructed such that when the DB connection instruction is executed, the DB connection service automatically writes the operation state to the operation log 184.

The storage to which the operation log 184 is written is not limited to the memory card 172 but may be the main memory 126, the nonvolatile memory 128 (FIG. 2), or a storing device on the outside of the PLC 100. A storing device which can hold the operation logs 184 even in the case where the power of the PLC 100 is interrupted is preferable.

Figure 6:
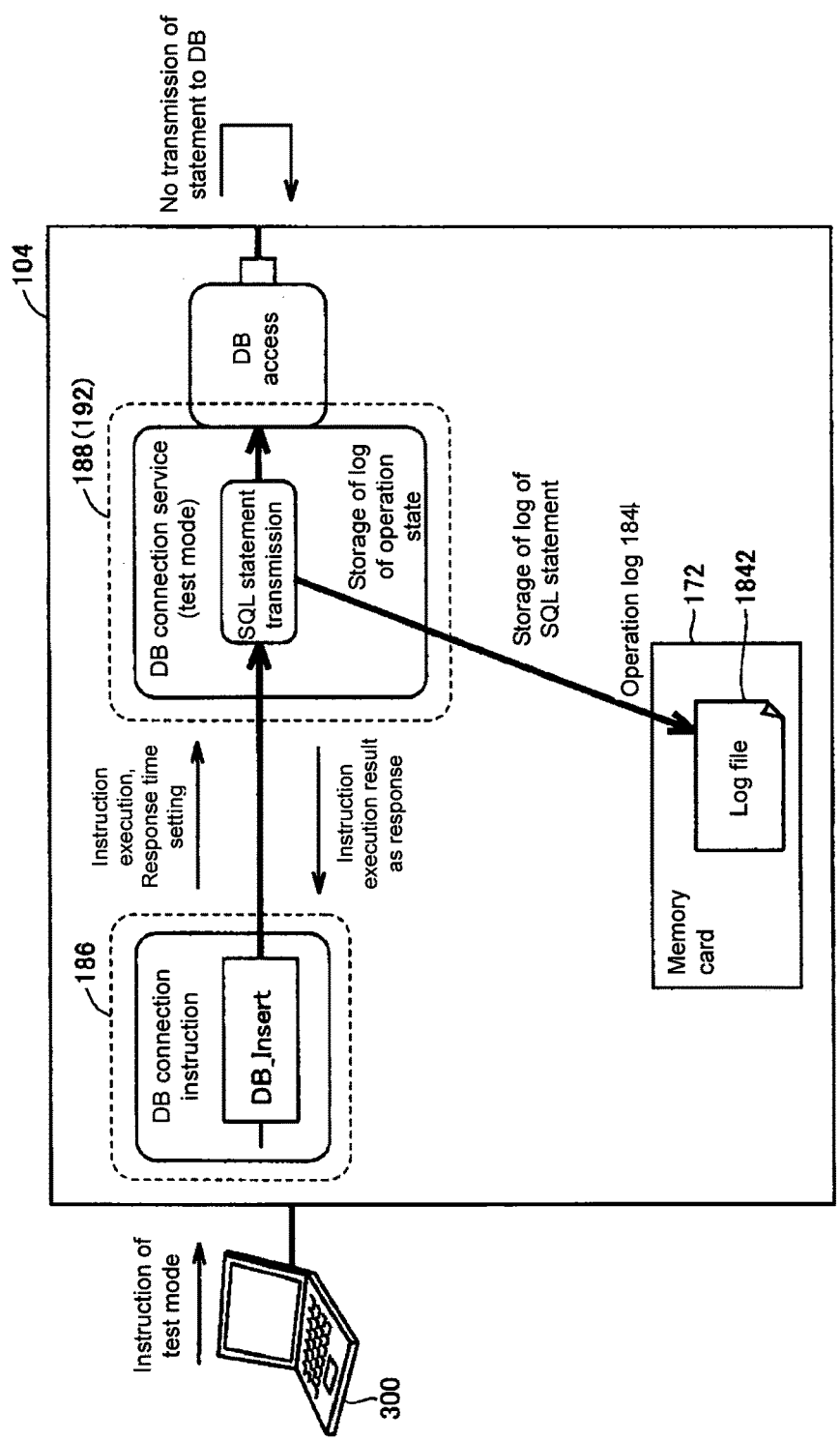
FIG. 6 is a diagram illustrating outline of communication process and outline of logging in the case where the PLC in the embodiment operates in a test mode.

FIG. 6 is a diagram illustrating outline of a communication process and outline of logging in the case where the PLC 100 in the embodiment operates in the test mode. Either the test mode or the operating mode, in which the DB connection service is operated, can be instructed from the support device 300.

The operation in the test mode will be compared with the case where the DB connection service is operated in the operating mode. In the DB connection service, during the operation in the test mode, an SQL statement is generated according to the DB connection instruction and, without transmitting the generated SQL statement to the database device 400, a result of the execution of the SQL statement is transmitted to the user program 186. In the DB connection service, either a response indicating that the SQL statement is normally executed in the database device 400, or a response indicating that execution of the SQL statement becomes an error in the database device 400 is output to the user program 186 (which one of the responses to be output can be set). For example, at the time of performing debugging of the user program 186 by using the support device 300, there is a case such that the DB connection service of the CPU unit 104 is operated in the test mode to check the operation of the user program 186 in each of a response indicating that a process is performed normally in the database device 400 and a response indicating that an error occurs in a process in the database device 400.

Also in the case where the DB connection service operates in the test mode, the SQL statement generated according to the DB connection instruction is written in the operation log 184. It facilitates debugging of the user program 186.

The support device 300 can set response time of the DB connection service in the test mode. As described above, in the case where the DB connection service operates in the test mode, the DB connection service sends the SQL statement to the user program 186 without transmitting it to the database device 400. By operating the support device 300, the user can set the response time of the DB connection service so that a response result is output after lapse of the set response time since the DB connection service is called by the DB connection instruction included in the user program 186. Consequently, in consideration of the assumed response time from the database device 400, the DB connection service is set in the test mode, and debugging of the user program 186 can be performed.

F. Operation Log 184

With reference to FIG. 7, the operation log 184 recorded by the PLC 100 will be described. FIG. 7 is a diagram illustrating the operation log 184. Logs recorded in the operation log 184 include entry 184A, date and time 184B, category 184C, log name 184D, result 184E, connection name 184F, serial ID 184G, table name 184H, and SQL statement 184J.

The data and time 184B indicates time at which a process as a log acquisition target occurs. The category 184C indicates the attribute of a log. The log name 184D includes information by which the log can be grasped at a glance. The result 184E includes a code indicative of a result of the process and includes, for example, information indicating whether connection to the database device 400 has succeeded or failed. The DB connection name 184F and the serial ID 184G are mainly information regarding the DB connection and includes information of a setting which is used among preset connection settings. The table name 184H includes information of identifying a database table connected by the PLC 100. The SQL statement 184J is an SQL statement generated according to the DB connection instruction by the DB connection service.

G. Process Procedure

Figure 8:
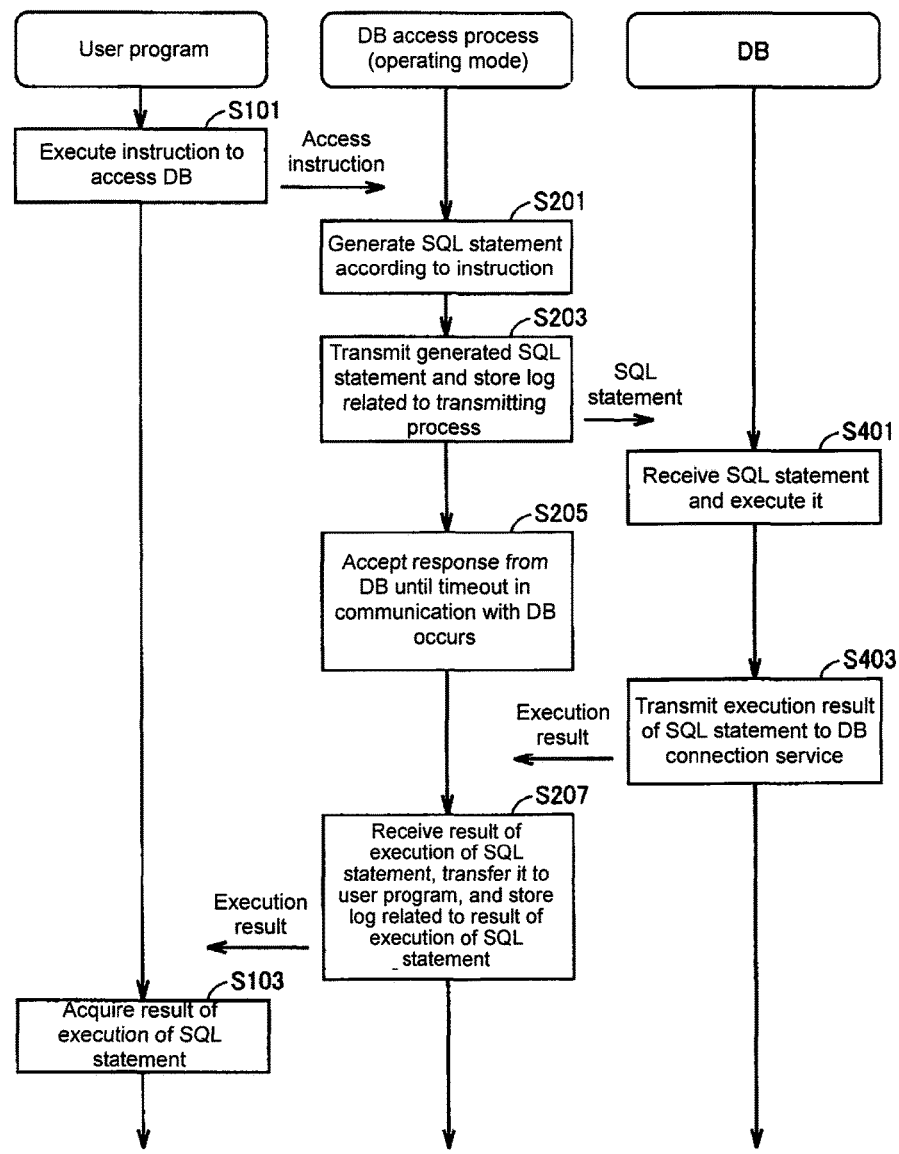
FIG. 8 is a flowchart illustrating the procedure in the PLC and the procedure in the database device in the embodiment.

Next, a process of communication between the PLC 100 in the embodiment and the database device 400 and a process of logging will be described. FIG. 8 is a flowchart illustrating the procedure in the PLC 100 in the embodiment and the procedure of the database device 400. In FIG. 8, the DB connection service (DB access process program) is operated in the operating mode.

The steps shown in FIG. 8 are realized when the processor 120 in the CPU unit 104 executes each of the user program 186 and the system program 188. Although FIG. 8 illustrates an example that the user program 186 and the system program 188 are executed independently of each other, a single program including both of the programs may be executed.

Referring to FIG. 8, regarding execution of the user program 186, the processor 120 loads the user program 186 prestored and executes the loaded user program 186 repeatedly in predetermined cycles. It is assumed that the user program 186 which is to be loaded is compiled and of an object format which can be executed. A source code generated by the user may be loaded as it is, or may be complied with an intermediate code, and the intermediate code may be loaded. In this case, while compiling the loaded code, the processor 120 executes the process. That is, the processor 120 executes a designated process while calling the system program 188 as necessary in accordance with an instruction included in the user program 186.

In step S101, when the processor 120 executes a process in accordance with the instruction included in the user program 186 and executes an instruction to access the database device 400, a process of accessing the database device 400 by the DB access process program 192 starts.

In step S201, to execute an access to the database device 400 by the DB access process program 192, the processor 120 generates a statement (SQL statement) according to the instruction for accessing the database device 400, the statement being included in the user program 186.

In step S203, the processor 120 transmits the generated SQL statement to the database device 400 and stores a log related to the transmitting process into the operation log 184.

In step S205, the processor 120 sets a timeout period in communication with the database device 400 and accepts a response from the database device 400 until a communication timeout occurs.

In step S401, the database device 400 receives the SQL statement transmitted from the PLC 100 and executes the received SQL statement.

In step S403, the database device 400 sends an execution result of the SQL statement to the PLC 100.

In step S207, the processor 120 receives a response indicative of a result of execution of the SQL statement in the database device 400 from the database device 400 before lapse of the timeout period which is set for communication with the database device 400, and transfers the response from the database device 400 to the user program 186 from the DB access process program 192. The processor 120 stores a log related to the response result received from the database device 400 into the operation log 184.

In step S103, the processor 120 executes the user program 186 in accordance with the execution result of the SQL statement.

Operation of DB Connection Service in Test Mode

Figure 9:
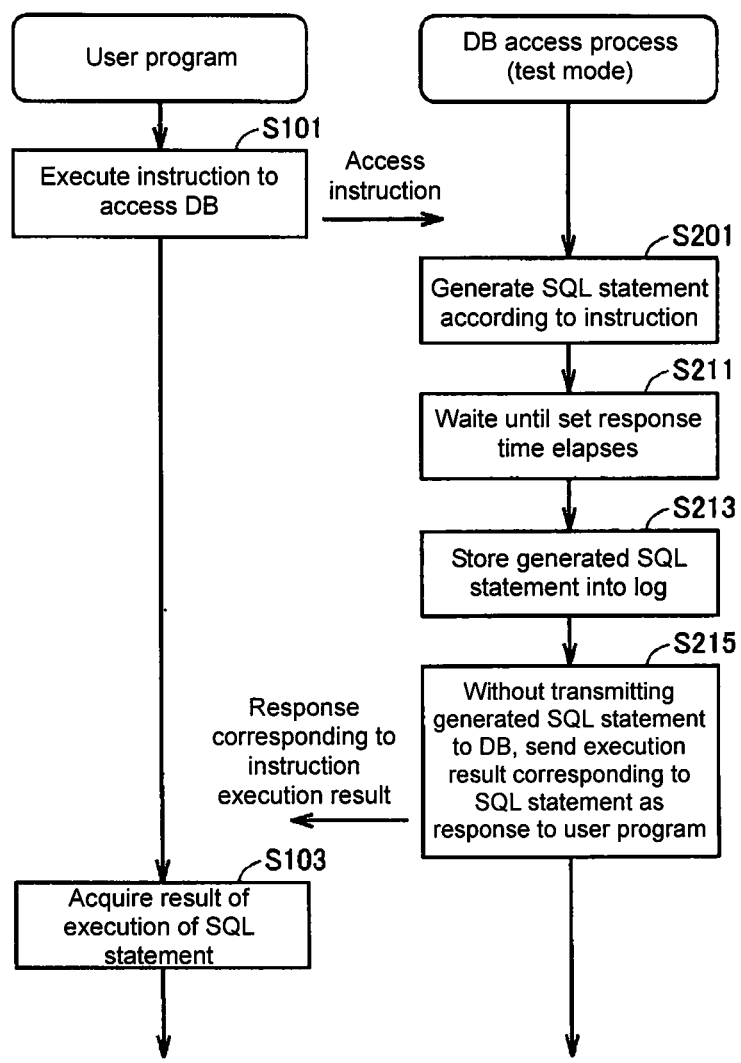
FIG. 9 is a flowchart illustrating the procedure of the PLC in a test mode.

Referring now to FIG. 9, the operation of the DB connection service (DB access process program) in the test mode will be described. FIG. 9 is a flowchart illustrating the process procedure of the PLC 100 in the test mode. As described above, it is assumed that, in the test mode, the DB connection service is called by a DB connection instruction included in the user program 186 and a response result is output after lapse of response time set by the support device 300 or the like.

In step S101, the processor 120 executes a process in accordance with an instruction included in the user program 186, executes an instruction for accessing the database device 400, and operates the DB access process program 192.

In step S201, by the DB access process program 192, the processor 120 generates a statement (SQL statement) according to an instruction to access the database device 400, the statement being included in the user program 186.

In step S211, the processor 120 waits until the set response time elapses.

In step S213, the processor 120 stores the SQL statement generated in step S201 into the operation log 184.

In step S215, without transmitting the generated SQL statement to the database device 400, the processor 120 sends an instruction execution result corresponding to the generated SQL statement from the DB access process program 192 to the user program 186.

In step S103, the processor 120 executes the user program 186 in accordance with the execution result of the SQL statement.

By the processes shown in FIGS. 8 and 9, the DB connection service operates while switching the operating mode and the test mode.

H. Acquisition of Log

The operation log 184 recorded by the PLC 100 is acquired by, for example, the support device 300, and the user can refer to the operation log 184 by operating the support device 300. For example, the support device 300 acquires the operation log 184 from the PLC 100 as follows. The support device 300 performs communication with the PLC 100, reads the operation log 184 from the memory by the system program 188 of the PLC 100, and causes the read operation log 184 to be transmitted from the PLC 100 to the support device 300.

Figure 10:
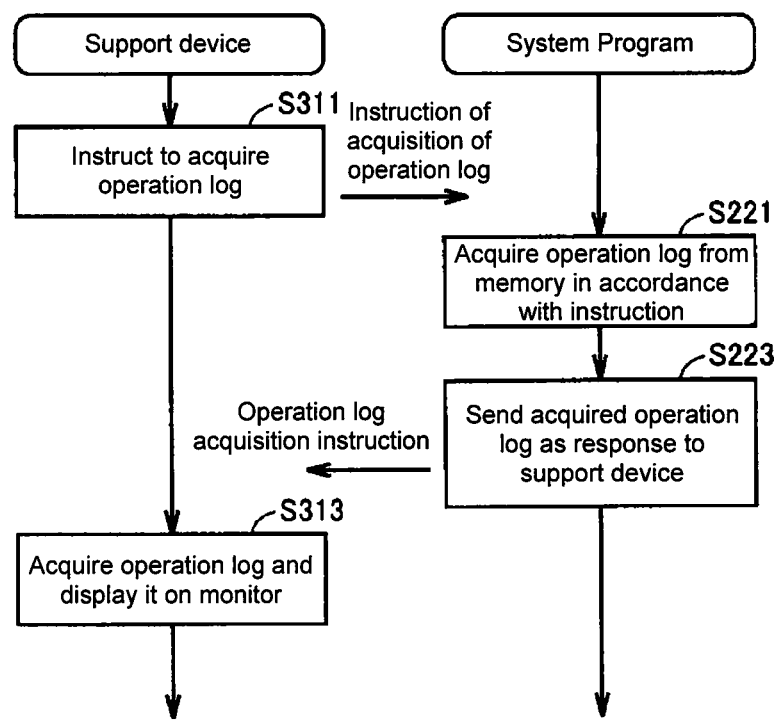
FIG. 10 is a flowchart illustrating process to obtain the operation log by the support device.

FIG. 10 is a flowchart showing a process to obtain the operation log 184 by the support device 300.

In step S311, the support device 300 instructs the PLC 100 to obtain the operation log 184.

In step S221, the processor 120 executes the system program 188, thereby acquiring the operation log 184 in accordance with the operation log acquisition instruction.

In step S223, the processor 120 transmits the acquired operation log 184 to the user program 186 by the process of the system program 188.

In step S313, the support device 300 acquires the operation log 184 from the PLC 100 and displays the acquired operation log 184 on the monitor 314.

By reading the operation log 184 by execution of the user program 186, for example, the operation log 184 can be acquired after execution of an arbitrary instruction in the user program 186, and the user can address to the cause of an inconvenience or the like in communication between the PLC 100 and the database device 400.

As another method, by causing a predetermined instruction to be included in the user program, the operation log 184 may be read from the memory. The user can cause the log acquisition instruction to be included in the user program 186 by operating the support device 300. The processor 120 executes a process of reading the operation log 184 while calling the system program 188 or the DB access process program 192 by the log acquisition instruction in the user program 186. By reading the operation log 184 by the user program 186, for example, the operation log 184 can be displayed in the support device 300.

I. Example of Instruction of Operation Mode by Support Device 300

A process of switching the operation mode of operating the DB connection service of the CPU unit 104 between the operating mode and the test mode may be performed by, for example, the system program 188 of the PLC 100 on the basis of an instruction of the support device 300.

Figure 11:
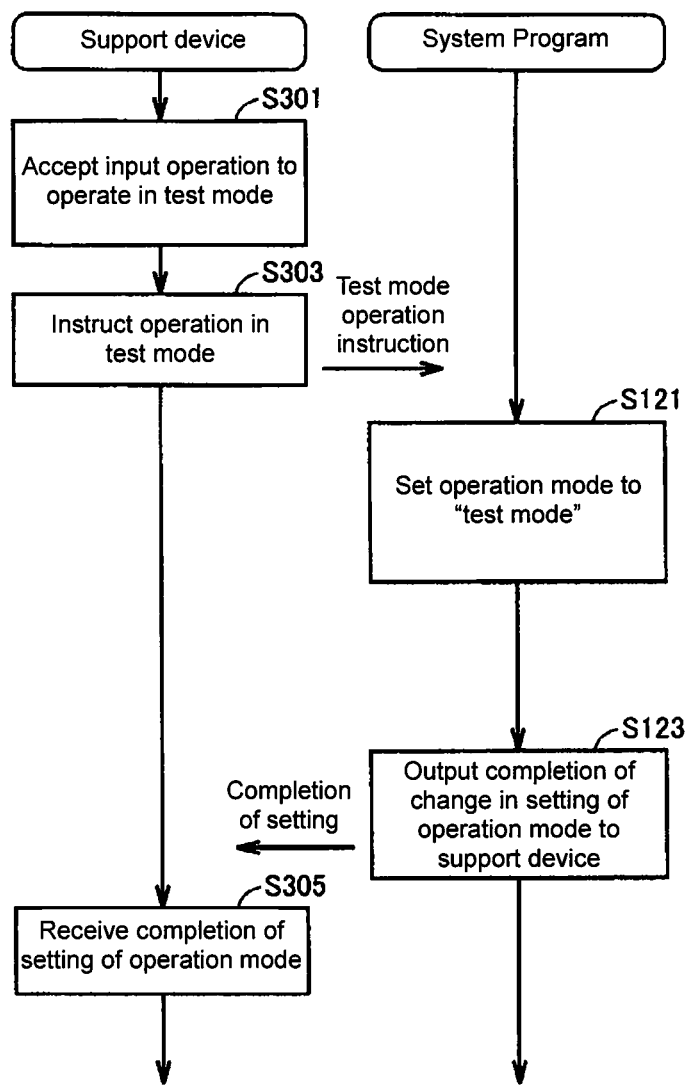
FIG. 11 is a diagram illustrating an example of procedure of giving an operation instruction from the support device to the PLC in the test mode.

FIG. 11 is a diagram illustrating an example of the procedure of a process of giving an operation instruction in the test mode from the support device 300, to the PLC 100.

In step S301, the support device 300 accepts from the user an input operation for causing the DB connection service of the CPU unit 104 to operate in the test mode.

In step S303, the support device 300 transmits an instruction to switch the operation mode in accordance with the input operation in step S301 to the CPU unit 104.

In step S121, the processor 120 of the CPU unit 104 performs communication with the support device 300 by the function of the system program 188, and accepts from the support device 300 the instruction to switch the operation mode. The processor 120 sets the operation mode of the DB connection service in accordance with the instruction accepted from the support device 300.

In step S123, after completion of the setting change of the operation mode of the DB connection service, the processor 120 notifies the support device 300 of the completion of the setting.

In step S305, the support device 300 receives the notification of completion of the setting change of the operation mode of the DB connection service from the CPU unit 104.

In such a manner, the support device 300 can switch the operation mode of the DB connection service of the PLC 100 in accordance with the input operation of the user, and debugging by the user can be facilitated.

Alternatively, an instruction of designating either the operating mode or the test mode to operate the DB connection service may be included in the user program. At the time of generating a program using the support device 300, the user defines either the operating mode or the test mode to operate the DB connection service. A user program including the designation of the operation mode is generated by the support device 300 and is transmitted to the PLC 100. The PLC 100 operates in accordance with the designation of the operation mode at the time of execution of the user program.

J. Example of User Interface

FIG. 12 is a diagram illustrating an example of a user interface provided in the support device 300 in the embodiment. The support device 300 can display the operation log 184 in the monitor of the support device 300.

The support device 300 acquires the operation log 184 from the PLC 100, for example, by the procedure shown in FIG. 10.

As illustrated in FIG. 12, in a display screen 380, the operation logs 184 are displayed as a list. In each of entries (381, 382, 383, and 384) in an operation log display 388, various pieces of data included in the operation log 184 (illustrated in FIG. 7) is displayed.

The support device 300 displays, for example, an acquisition button 390 in the display screen 380. By accepting an input operation on the acquisition button 390 from the user, the operation log 184 may be acquired from the PLC 100. For example, by acceptance of an input operation on the acquisition button 390, the support device 300 may execute the procedure shown in FIG. 10. Detailed information of the entry selected by the user (in FIG. 12, emphasizing the entry 381 with the frame shows that the entry 381 is selected by the user) may be displayed in the operation log display 388. In the example of FIG. 12, the log of the SQL statement generated by the DB connection service in the entry 381 is displayed as detailed information 389.

By employing a configuration as described above, in the configuration in which the PLC is connected to another system (such as a database system), the user facilitates debugging in a user program which is operated by cooperation of the PLC and the another system by causing the DB connection service of the PLC to operate in the test mode without actual communication between the another system and the PLC.

In the foregoing embodiment, the example was described in which, for example, in the case where the PLC 100 receives a request to read the operation log 184 from the support device 300 by the system program 188 so that the support device 300 displays the operation log 184 on the monitor, the operation log 184 is read from a predetermined memory and sent as a response to the support device 300. Another method may be employed such that, for example, the CPU unit 104 has an FTP (File Transfer Protocol) server function, the CPU unit 104 is logged in by FTP client software, and the FTP client software obtains the operation log 184 by the FTP.

It is to be noted that the embodiments disclosed here are illustrative and not restrictive in all of aspects. The scope of the present invention is defined by the scope of claims rather than by the above description, and all changes that fall within the scope of claims or equivalence are intended to be included.

What is claimed is:

1. A programmable controller comprising:
a communication interface configured to be connected to a database system;
an instruction executing unit configured to execute a user program for controlling a control object, the user program including an access instruction, the instruction executing unit executing the access instruction to access the database system; and
an access processing unit that controls the access to the database system via the communication interface by generating a database access statement according to the access instruction, wherein
the programmable controller sets the access processing unit to operate in a first mode and a second mode based on an instruction included in the user program, the access processing unit switches to the one of the first mode and the second mode in accordance with a designation received via the communication interface, in the first mode, the access processing unit transmits the generated database access statement according to the access instruction to the database system using the communication interface and sends a result of a response of the database system to the database access statement to the user program, and in the second mode, the access processing unit sends an execution result corresponding to the generated database access statement to the user program without transmitting the database access statement to the database system to facilitate a debugging operation of the user program without communicating with the database system.

2. The programmable controller according to claim 1, further comprising a counting unit configured to count time based on a clock supplied by a system clock, wherein at the time of executing a predetermined process in the user program, the instruction executing unit stores into a memory the process and time counted by the counting unit in association with each other, as a log, and the access processing unit stores into the memory a process according to the access instruction and time counted by the counting unit in association with each other, as the log.

3. The programmable controller according to claim 2, wherein the access processing unit generates the database access statement according to the access instruction and stores the generated database access statement as the log into the memory.

4. The programmable controller according to claim 1, wherein in the second mode, the access processing unit transmits to the user program, as an execution result corresponding to the database access statement according to the access instruction, a response indicating that an access to the database system according to the database access statement is normally performed or a response indicative of occurrence of an error in an access to the database system according to the database access statement.

5. The programmable controller according to claim 1, wherein a control unit comprises a response time setting unit configured to accept a setting of response time and, in the case of operating in the second mode, outputs a result of a process according to the access instruction after lapse of the set response time since start of the process.

6. The programmable controller according to claim 1, further comprising an input/output unit configured to transmit/receive data to/from an information processing apparatus connected to the programmable controller through the communication interface, wherein the input/output unit outputs a result of a response to the user program by the access processing unit to the information processing apparatus in response to a request of the information processing apparatus.

7. The programmable controller according to claim 6, wherein the input/output unit accepts the designation of the one of the first mode and the second mode in which the access processing unit is to be operated from the information processing apparatus, and the access processing unit switches to the one of the first more and the second mode in accordance with the designation accepted from the information processing apparatus.

8. The programmable controller according to claim 1, wherein the user program includes a designation instruction of instructing either the first mode or the second mode in which the access processing unit is to be operated, and the access processing unit operates in either the first mode or the second mode in accordance with the designation indicated by the designation instruction.

9. A computer-readable recording medium storing a computer program executable by a processor and configured to control operation of a programmable controller, wherein the programmable controller comprises a communication interface configured to access a database system, the processor, and a memory, and the program causes the processor to perform operations comprising:

executing a user program to control a control object;

at the time of executing the user program including an access instruction to access the database system, controlling an access to the database system via the communication interface by a database access statement generated according to the access instruction, controlling an access to the database system by the database access statement according to the access instruction is performed in a first mode and a second mode based on an instruction included in the user program, wherein the program causes the processor to switch to the one of the first mode and the second mode in accordance with a designation received via the communication interface, in the first mode, the program causes the processor to perform operations comprising transmitting the database access statement according to the access instruction to the database system using the communication interface and sending a result of a response of the database system to the database access statement to the user program, and in the second mode, the program causes the processor to perform operations comprising sending the result of execution corresponding to the database access statement to the user program without transmitting the database access statement to the database system to facilitate a debugging operation of the user program without communicating with the database system.

10. An information processing apparatus to be connected to a programmable controller, wherein the programmable controller comprises:

a communication interface configured to be connected to a database system;

an instruction executing unit configured to execute a user program for controlling a control object;

an access processing unit, at the time of executing the user program including an access instruction for accessing the database system executed by the instruction executing unit, the access processing unit configured to control an access to the database system via the communication interface by a database access statement generated according to the access instruction; and an input/output unit configured to be connected to the information processing apparatus and to transmit/receive data to/from the information processing apparatus, wherein the programmable controller sets the access processing unit to operate in a first mode and a second mode based on an instruction included in the user program, the access processing unit switches to the one of the first mode and the second mode in accordance with a designation received via the communication interface, in the first mode, the access processing unit transmits the database access statement according to the access instruction to the database system using the communication interface and sends a result of a response of the database system to the database access statement to the user program, and in the second mode, sends a result of execution corresponding to the database access statement to the user program to facilitate a debugging operation of the user program without transmitting the database access statement to the database system, and the information processing unit comprises:

a reception processing unit configured to receive a result of a response to the user program by the access processing unit via the input/output unit of the programmable controller; and a display processing unit configured to display the response result received by the reception processing unit on a monitor.

11. A programmable controller comprising:

a communication interface configured to be connected to a database system;

a processor; and a memory, wherein the processor is configured to execute a user program for controlling a control object, the user program including an access instruction to access the database system, wherein the user program causing the processor to perform operations comprising: controlling an access via the communication interface to the database system by generating a database access statement according to the access instruction, operate while switching between a first mode and a second mode based on an instruction included in the user program, in the case of operation in the first mode, transmitting the statement according to the access instruction to the database system using the communication interface, sending a result of a response of the database system to the database access statement to the user program, in the case of operation in the second mode, sending a result of execution corresponding to the database access statement to the user program without transmitting the database access statement to the database system to facilitate a debugging operation of the user program without communicating with the database system.

12. The programmable controller according to claim 2, further comprising an input/output unit configured to transmit/receive data to/from an information processing apparatus connected to the programmable controller, wherein the input/output unit outputs a result of a response by the database system to the database access statement to the user program by the access processing unit to the information processing apparatus in response to a request of the information processing apparatus.

13. The programmable controller according to claim 3, further comprising an input/output unit configured to transmit/receive data to/from an information processing apparatus connected to the programmable controller, wherein the input/output unit outputs a result of a response to the user program by the access processing unit to the information processing apparatus in response to a request of the information processing apparatus.

14. The programmable controller according to claim 4, further comprising an input/output unit configured to transmit/receive data to/from an information processing apparatus connected to the programmable controller, wherein the input/output unit outputs a result of a response to the user program by the access processing unit to the information processing apparatus in response to a request of the information processing apparatus.

15. The programmable controller according to claim 5, further comprising an input/output unit configured to transmit/receive data to/from an information processing apparatus connected to the programmable controller, wherein the input/output unit outputs a result of a response to the user program by the access processing unit to the information processing apparatus in response to a request of the information processing apparatus.

16. The programmable controller according to claim 1, further comprising a support device coupled to the programmable controller, wherein, in the second mode, the access processing unit stores the statement in an operation log and does not transmit the statement to the database system, the operation log is accessible by a user by way of an instruction sent to the central processing unit by way of the support device.

17. The information processing device according to claim 10, further comprising a support device coupled to the programmable controller, wherein, in the second mode, the access processing unit stores the statement in an operation log and does not transmit the statement to the database system, the operation log is accessible by a user by way of an instruction sent to the programmable controller by way of the support device.

18. The programmable controller according to claim 11, further comprising a support device coupled to the programmable controller, wherein, in the second mode, the access processing unit stores the statement in an operation log and does not transmit the statement to the database system, the operation log is accessible by a user by way of an instruction sent to the central processing unit by way of the support device.

19. The programmable controller according to claim 1, wherein the first mode corresponds to a normal operating mode, the second mode corresponds to a test mode, and the test mode is for checking operation of the user program by using an instruction for connection to another system in a state where the programmable controller is not connected to the another system.

20. The programmable controller according to claim 1, wherein the database access statement comprises an SQL statement.

* * * * *